W. W. Wilcox.
Strawberry Trellis.
No. 2896 Reissued Mar. 10, 1868
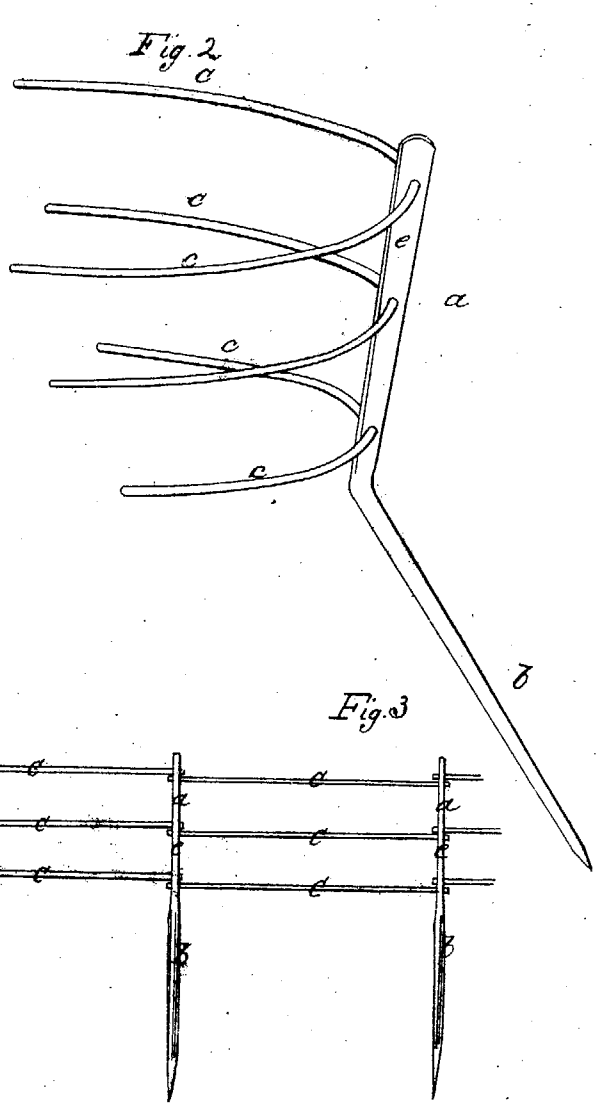
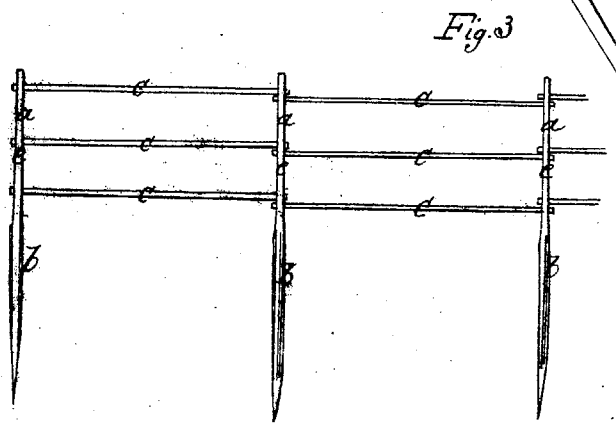
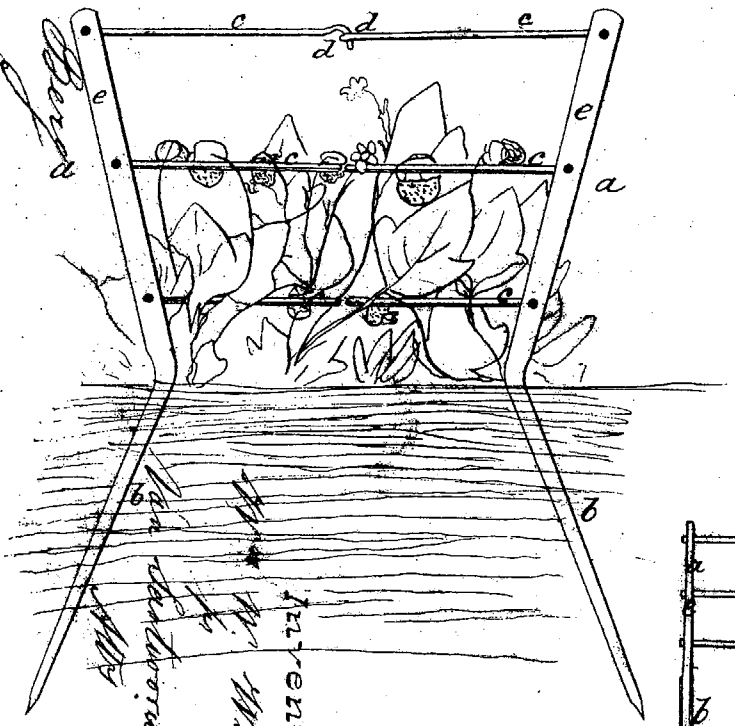
Witnesses
Gustav Berg
Hermann Grey
Inventor
W. W. Wilcox
by
Van Santvoord & Hauff
Attys

UNITED STATES PATENT OFFICE.

WILLIAM W. WILCOX, OF MIDDLETOWN, CONNECTICUT.

IMPROVEMENT IN TRELLIS FOR STRAWBERRY AND OTHER PLANTS.

Specification forming part of Letters Patent No. 68,271, dated August 27, 1867; Reissue No. 2,896, dated March 10, 1868.

*To all whom it may concern:*

Be it known that I, WILLIAM W. WILCOX, of Middletown, in the county of Middlesex, and in the State of Connecticut, have invented a a new and useful Improvement in Trellis for Strawberry and other Plants; and I do hereby declare that the following is a full, clear, and exact description thereof, which will enable those skilled in the art to make and use the same, reference being had to the accompanying drawings, forming part of this specification, in which drawings—

Figure 1 represents a sectional view of this invention, two trellises being shown as arranged on one "hill" of a strawberry or other plant. Fig. 2 is a perspective view of a single trellis. Fig. 3 is a modification, showing the posts of the trellis arranged in a row.

Similar letters indicate corresponding parts.

This invention relates to a frame or trellis intended to protect and support strawberry and other plants, and keep the fruit or flowers from contact with the ground.

The letter *a* designates the trellis; and it consists of a portable frame of galvanized iron or other suitable material, those materials being preferred—as, for instance, such metals or wood which are not liable to corrosion.

The frame is made of an upright post, *e*, whose lower end, *b*, is sharp-pointed to allow it to enter the ground with facility, said lower end being bent to any suitable angle with that part of the post which remains above the ground, so that it will not be liable to sink farther into the ground by its own weight or by accidental pressure. The upper part of the post *e* has a series of horizontal branching arms, *c*, which are nearly semicircular in this example, and placed at a suitable distance from each other.

I do not wish to restrict myself to the form (here shown) of the arms *c* or of the post which supports them, for both the arms and the post can be modified or varied in form without departing from my invention, which consists in a post or frame with branches or arms extending therefrom in one or more directions, supported in the ground by forcing the lower end of the post or frame into the soil, the whole forming a portable trellis.

In Fig. 1 I have shown two trellises or frames, *a*, placed face to face, and interlocked by means of hooks *d* formed on the end of the upper arms, *c c*, of each trellis. The trellis may be used singly also, and the posts *e* may have arms *c* branching from the rear side, or they may have radial arms diverging in many directions, or the arms may be complete circles or of any other shape desired.

In using my trellis for strawberry-plants, I arrange the same around a vine with care a little while before the fruit appears, and if the vine is large and heavy the tops of the trellises are hooked together so that the stalks will not fall backward on the ground. The sharp-pointed end *b* of the post *e* is crowded into the ground until the lower arm, *c*, is about one and a half inches above the surface, more or less. The stalks fall naturally on the arms *c*, and are held up in easy position. When vines are thus supported it is impossible for the fruit to become soiled, the berries being held up free from the ground and high enough to escape being spattered with sand from the effects of heavy rains. The berries are also better exposed to the sun and air, the arrangement of the branching-arms *c* causing them to be more open to the air than they are by ordinary methods of cultivation. My invention also allows the ground to be cultivated between the rows and between adjacent vines without disturbing them. In using my trellis for large plants, such as rose-bushes or large tomatoes, it may be desirable to strengthen their position by lateral braces.

When my trellis is used for plants which are cultivated in rows, the arms of one trellis are allowed to rest on those of the next in the series, and the arms can be stiffened by transverse bars to prevent them from becoming bent. My invention can also be modified by making the posts which support the arms *c* heavy, so that they will maintain themselves upright when set on the ground without requiring to be fastened or sunk in the soil.

When winter approaches I remove the trellises from the field and house them for preservation. If necessary, for strength, I use two or more posts, *e*, in making my trellis; but when I use stiff wire for the arms *c*, I find one bar to answer the purpose.

The modification shown in red outlines in Fig. 3 is intended for vines cultivated in rows, in which case the trellis or frame is continuous with the rows.

I place the posts *e* in or on the ground on both sides of a row, and extend the arm *c* (made straight or crooked to suit the judgement of the gardener) from post to post. The plants lean on the bars and arms, as before explained. The rectilinear trellises (shown in Fig. 3) may also be connected by cross bars or wires, so that the same will not fall backward by the pressure of the plants.

What I claim as new, and desire to secure by Letters Patent, is—

A trellis *a*, made substantially as described, with an upright post or posts, *e*, and branching arms *c*, or their equivalent.

WILLIAM W. WILCOX.

Witnesses:
W. HAUFF,
GUSTAV BERG.